United States Patent
Moeller et al.

(10) Patent No.: US 9,567,745 B2
(45) Date of Patent: Feb. 14, 2017

(54) STRAKE FOR A WIND TURBINE TOWER

(71) Applicant: SIEMENS AKTIENGESELLSCHAFT, München (DE)

(72) Inventors: Jesper Moeller, Brande (DK); Jacob Groenvald Nielsen, Aarhus V. (DK); Kenneth Helligsoe Svinth, Aarhus C. (DK)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 14/865,033

(22) Filed: Sep. 25, 2015

(65) Prior Publication Data

US 2016/0160499 A1 Jun. 9, 2016

(30) Foreign Application Priority Data

Dec. 4, 2014 (EP) .................................. 14196250

(51) Int. Cl.
| | |
|---|---|
| *E04B 1/98* | (2006.01) |
| *E04H 12/00* | (2006.01) |
| *F03D 1/00* | (2006.01) |
| *E04B 1/41* | (2006.01) |
| *F03D 7/02* | (2006.01) |

(Continued)

(52) U.S. Cl.
CPC . *E04B 1/98* (2013.01); *E04B 1/40* (2013.01); *E04H 12/00* (2013.01); *F03D 1/001* (2013.01); *F03D 1/005* (2013.01); *F03D 7/0296* (2013.01); *F03D 11/04* (2013.01); *E04B 2001/405* (2013.01); *F03D 13/20* (2016.05);

(Continued)

(58) Field of Classification Search
CPC ........ E04B 1/98; E04B 1/40; E04B 2001/405; F03D 11/04; F03D 1/001; F03D 1/005; F03D 7/0296; F03D 13/20; E04H 12/00; F05B 2250/11; F05B 2250/312; F05B 2250/912
USPC .................................................. 405/211, 216
See application file for complete search history.

(56) References Cited

U.S. PATENT DOCUMENTS 3,105,866 A * 10/1963 Little ....................... H02G 7/14
174/135
3,991,550 A * 11/1976 Cohen .................... D07B 5/005
174/42

(Continued)

FOREIGN PATENT DOCUMENTS

| | | |
|---|---|---|
| CN | 103423098 A | 12/2013 |
| DE | 202010002845 U1 | 7/2010 |

(Continued)

OTHER PUBLICATIONS

European Extended Search Report issued May 19, 2015; Application No. 14196250.6; 6 pgs.

*Primary Examiner* — Brent W Herring
(74) *Attorney, Agent, or Firm* — Schmeiser Olsen & Watts LLP (57) ABSTRACT

A strake for a wind turbine tower is provided A strake for a wind turbine tower is disclosed, whereby the strake is realized as a detachable strake to be mounted to a wind turbine tower to reduce vortex induced vibrations. The strake includes an outer structure and the outer structure defines three sides that are interconnected by three angles, so that the strake includes a mainly triangular shape in its cross-cut perpendicular to its longitudinal direction. The (Continued)

strake includes at least one element that includes a contiguous cavity that is filled with a fluid.

10 Claims, 5 Drawing Sheets

(51) Int. Cl.
*F03D 11/04* (2006.01)
*E04B 1/38* (2006.01)

(52) U.S. Cl.
CPC ..... *F05B 2240/912* (2013.01); *F05B 2250/11* (2013.01); *F05B 2250/312* (2013.01)

(56) References Cited

U.S. PATENT DOCUMENTS

| | | | |
|---|---|---|---|
| 4,180,369 A | 12/1979 | Ottosen | |
| 4,660,497 A * | 4/1987 | Cochran | B63B 7/082 114/345 |
| 5,174,701 A * | 12/1992 | Small | B60P 7/08 294/110.1 |
| 5,192,105 A * | 3/1993 | Walker | B25J 1/02 294/119.2 |
| 5,308,191 A * | 5/1994 | Goans | E02B 15/08 405/63 |
| 6,019,549 A * | 2/2000 | Blair | E01D 19/02 24/460 |
| 6,092,483 A * | 7/2000 | Allen | B63B 1/048 114/264 |
| 6,347,911 B1 * | 2/2002 | Blair | E01D 19/02 24/462 |
| 6,695,540 B1 | 2/2004 | Taquino | |
| 6,896,447 B1 * | 5/2005 | Taquino | F15D 1/10 114/243 |
| 7,108,457 B1 * | 9/2006 | Brown | E21B 17/01 114/144 B |
| 7,458,752 B2 * | 12/2008 | Esselbrugge | B63B 21/502 114/243 |
| 7,600,945 B2 * | 10/2009 | Burgess | B63B 21/502 114/243 |
| 7,674,074 B2 * | 3/2010 | Masters | E21B 17/01 405/216 |
| 8,251,005 B2 * | 8/2012 | Caracostis | B63B 35/4413 114/243 |
| 8,408,154 B2 * | 4/2013 | Haney | B63B 21/502 114/243 |
| 8,475,085 B2 * | 7/2013 | Masters | E21B 17/01 405/216 |
| 8,511,245 B2 * | 8/2013 | Dehne | F16L 1/123 114/243 |
| 8,522,417 B2 * | 9/2013 | Miller | F01D 5/26 29/522.1 |
| 8,647,050 B2 * | 2/2014 | Krietzman | F03D 1/04 415/211.2 |
| 8,944,722 B1 * | 2/2015 | Allen | E02B 17/0017 405/216 |
| 9,085,995 B2 * | 7/2015 | Francisco | F01D 25/162 |
| 2006/0153642 A1 | 7/2006 | Esselbrugge et al. | |
| 2007/0104542 A1 * | 5/2007 | Somerville | B63B 21/663 405/224.1 |
| 2007/0231077 A1 * | 10/2007 | Burgess | B63B 21/502 405/216 |
| 2008/0050181 A1 * | 2/2008 | Masters | E21B 17/01 405/211 |
| 2009/0019791 A1 | 1/2009 | Llorente Gonzalez | |
| 2010/0061809 A1 * | 3/2010 | Allen | B63B 39/005 405/216 |
| 2010/0156088 A1 * | 6/2010 | Masters | F16F 15/02 285/18 |
| 2010/0232968 A1 * | 9/2010 | Miller | F01D 5/26 416/190 |
| 2011/0005443 A1 * | 1/2011 | Caracostis | B63B 35/4413 114/264 |
| 2012/0291687 A1 * | 11/2012 | Dehne | F16L 1/123 114/271 |
| 2013/0064644 A1 * | 3/2013 | Krietzman | F03D 1/04 415/1 |
| 2013/0280027 A1 * | 10/2013 | Francisco | F01D 25/162 415/1 |
| 2013/0309097 A1 * | 11/2013 | Miller | F01D 5/26 416/232 |
| 2015/0086276 A1 * | 3/2015 | Harbison | F15D 1/12 405/216 |

FOREIGN PATENT DOCUMENTS

| | | |
|---|---|---|
| EP | 1881195 A1 | 1/2008 |
| EP | 2525123 A1 | 11/2012 |
| KR | 20090102396 A | 9/2009 |
| KR | 20110045711 A | 5/2011 |

* cited by examiner

STRAKE FOR A WIND TURBINE TOWER

CROSS-REFERENCE TO RELATED APPLICATIONS

This application claims priority to European Application No. EP 14196250.6, having a filing date of Dec. 4, 2014, the entire contents of which are hereby incorporated by reference.

FIELD OF TECHNOLOGY

The following relates to a strake for a wind turbine tower, a method to handle the strake and an arrangement to mount the strake to the wind turbine.

BACKGROUND

A wind turbine comprises a rotor that is connected to a nacelle. The nacelle arranged on top of a tower, and the tower is connected to a foundation.

To install a wind turbine, the wind turbine is transported in several parts to the installation site.

At the installation site the tower is connected to the foundation and thereafter the nacelle and the rotor are installed on top of the tower.

The tower often comprises several segments that are connected to form the tower.

Wind turbines are installed onshore and offshore. Offshore wind turbines are installed on a monopole or a tripod, for example. The parts of the wind turbine are transported to the offshore installation site by ship.

The tower of an offshore wind turbine is stored on the ship in an upright position.

Wind acts on the tower during transportation and installation. The wind induces vibrations into the tower. The above-indicated vibrations are commonly called vortex induced vibrations (VIV) which can be the result of alternating vortex shedding around the tower in strong wind conditions. This shedding results in alternating pressure differences over the wind turbine tower's cross-section. These vibrations can damage the tower and disturb the installation work in progress.

Several measures are known to dampen the vibrations. It is known to install vibration absorption components at the tower.

CN 29121154817 A1 discloses a tower drum, and further provides a wind generating set containing the tower drum. The tower drum comprises a tower drum body used for supporting a wind driven generator. A vibration absorption component used for reducing transverse vibration of the tower drum body is arranged on the peripheral surface of the tower drum body.

KR 20090102396 A describes a device for damping vibration which is caused of the vortex of an aero-generator tower, that is provided to extend the service life by reducing the vibration of the aero-generator by mounting a vortex reducing member to the tower.

US 2009019791 A1 describes a tool for preventing the vortex effect, comprising three corrugated tubes which extend helically from the upper end (2) of the tower (3), such as to cover only the upper part thereof.

The described detachable strakes are installed at the tower of the wind turbine before the tower is shipped to the installation site. After the installation, the strakes are detached from the wind turbine, and they need to be stored and transported. The handling of the strakes can become difficult.

SUMMARY

An aspect relates to an improved strake for a wind turbine tower.

A strake for a wind turbine tower is disclosed. The strake is realized as a detachable strake to be mounted to a wind turbine tower to reduce vortex induced by vibrations.

The strake comprises an outer structure and the outer structure defines three sides that are interconnected by three angles so that the strake comprises a mainly triangular shape in its crosscut perpendicular to its longitudinal direction.

The strake comprises at least one element that comprises a fatigue cavity that is filled with a fluid.

A strake is used at a wind turbine tower to prevent the development of vortex induced vibrations. The strake is detachably connected to the tower during transportation and installation of the tower.

The strake comprises a triangular shape seen in a crosscut vertical to its longitudinal direction. Thus, the strake comprises three sides that are interconnected by three angles.

The strake is attached to the outer surface of the wind turbine tower before the transportation. The strake is wrapped around the tower to lead along the outer surface.

The tower, including the strake, is then loaded on a ship, shipped to the installation side of the wind turbine, and is there installed on a foundation by a crane.

Before the installation of the nacelle on top of the tower, the strake is detached from the tower and is stored on board of the ship for further use.

The strake comprises at least one element that comprises a contiguous cavity that is filled with a fluid. When the strake is stored on board of the ship, the fluid is evacuated from the cavity and the strake can be reduced in its volume.

Thus, the strake is easier to store and to handle. Before the strake is used for the transportation and installation of the next wind turbine tower, the cavity inside the strake is filled with a fluid. Thus, the volume of the strake and the stability increases.

The cavity comprises at least 80% of the volume of the element when the cavity is filled with the fluid.

Thus, the strake comprises an outer shell and/or an inner structure, that takes up to 20% of the volume of the strake. At least 80% of the volume of the strake comprises a cavity that is filled with a fluid.

Thus, by evacuating the cavity, the size of the strake can be shrunk down to a maximum of 20% of the volume, compared to the strake that is filled with the fluid.

The fluid is a gas, preferably air. A gas is a very lightweight fluid and especially air is available everywhere.

Thus, the cavity of the strake can be filled with gas, especially air, to increase the volume of the strake and to increase the stiffness.

After the use of the strake and the wind turbine tower, the strake can be evacuated and the gas, especially the air, can be let free in the atmosphere. Thus, no additional storage of the fluid is needed.

In addition, gas is a very lightweight fluid that leads to a lightweight strake that is easy to handle.

The outer structure comprises a pre-sealable opening that connects the cavity to the space around the strake to allow the fluid to enter or leave the cavity in the element.

The strake comprises at least one element and the element can be filled with a fluid, especially air. To fill or evacuate the cavity in the element of the strake, the outer structure of the strake comprises a re-sealable opening.

The opening comprises a re-sealable cap so that the opening can be closed after the strake is filled with the fluid, and the strake can be evacuated again by opening the re-sealable cap. Thus, the strake can be reused several times.

The element is inflatable and deflatable.

By inflating the element of the strake, the volume and the structural stability of the strake can be increased.

The strake is inflated before it is attached to the wind turbine tower. When the stability of the strake is high enough, the strake is attached to the wind turbine tower, and the wind turbine tower can be transported by ship.

After the strake is detached from the wind turbine tower, the element of the strake can be deflated. Thus, the volume of the strake can be reduced and the stiffness of the strake is decreased in a way that the strake is easier to store and to handle.

The element is elastically flexible so that the volume inside the strake is variable according to the amount of fluid present in the strake.

The cavity inside the element of the strake can be filled with the fluid. The element is elastically flexible so that the element can be filled with a fluid until a certain predetermined volume, or a certain predetermined pressure inside the cavity of the element, is reached.

The volume inside the strake depends on the pressure of the fluid inside the cavity of the strake. The element of the strake is elastically flexible. Thus, the element of the strake, and thus the strake, can be folded or rolled for transportation or storage of the strake. Thus, the strake is easier to handle and to transport when it is deflated.

The strake comprises a plurality of elements and the elements comprise an elongated shape and are mounted in parallel to form the strake.

The strake may comprise several elements, whereby the elements comprise mainly the same length than the strake and are mounted in parallel next to each other to form the strake.

The elements comprise cavities that are inflatable and deflatable. Thus, the volume of the strake can be increased or decreased by inflating or deflating the cavities of the elements.

Thus, the elements with the cavities form different chambers inside the strake. The chambers of the strake, thus the elements and the cavities, can be filled independently from each other.

In the case of a failure, an element might not have the right pressure of the fluid or an element might lose pressure, the strake itself is less sensible to failures of the elements, when several elements are used in parallel to each other.

A strake comprises at least three elements.

Three elements are used in parallel to each other, to abut on each other, with their sides. Thus, the three elements form a basically triangular-shaped form of a strake, whereby each of the elements defines one of the corners of the triangular-shaped strake.

Thus, using three elements is the easiest way to achieve a triangular-shaped strake.

The strake comprises a protective cover to enwrap at least one element.

The strake is subject to being handled under harsh conditions on board of a ship during inflation, installation, and transportation of the strake. Thus, damages might occur to the strake and to the elements.

A protective cover is used to enwrap at least one element of the strake to protect the element from damages. Thus, the lifetime of the element is enhanced.

A method is disclosed to handle a strake, whereby the strake is realized as a detachable strake to be mounted to a wind turbine tower to reduce vortex induced vibrations.

The strake comprises an outer structure and the outer structure defines three sides that are interconnected by three angles so that the strake comprises a triangular shape in its crosscut perpendicular to its longitudinal direction. The strake comprises at least one element that comprises a contiguous cavity.

The method comprises the step of filling the cavity with a fluid.

An element of the strake comprises a contiguous cavity that can be filled with a fluid. Before the use of the strake, the cavity of the element is filled with the fluid.

Thus, the volume of the strake is enhanced and the structural stability of the strake is increased. When the cavity of the element of the strake is filled with the fluid, the strake can be attached to a wind turbine tower.

The method comprises the additional step of deflating the element by reducing the amount of fluid in the cavity.

After the use of the strake at a wind turbine tower, the strake is detached from the wind turbine tower and is stored on board of the ship. The amount of fluid in the cavity of the element of the strake can be reduced to reduce the volume, the structural stability, and the weight of the strake. Thus, the strake is easier to handle and to be stored.

The element of the strake is elastically flexible and a method comprises the additional step of reducing the physical dimensions of the strake by folding or rolling the element.

Thus, the size of the strake can be reduced and the strake is easier to be handled or stored. The strake can for example be rolled up on a reel.

An arrangement to mount a strake is disclosed. The arrangement comprises a mounting bracket that is detachable attached to the wind turbine tower. The arrangement comprises at least one leg and a strake comprises an end and the end is attached to the leg. The arrangement comprises means to operate the arrangement that is connected to the leg. The means and the leg are rotatable in respect to the mounting bracket so that the detachable strake that is connected to the leg is wrapped around the tower when the leg is rotated in respect to the mounting bracket.

The strake needs to be mounted to the upper part of a wind turbine tower. Thereby, the strake needs to be wrapped around the outer surface of the wind turbine tower. An arrangement is mounted on top of the wind turbine tower to mount the strake to the tower. The arrangement comprises legs and a strake is attached to the legs.

The legs are connected in a star-shaped manner, whereby the middle point of the star is located mainly at the longitudinal axis of the tower. The legs reach from the middle point of the star outward perpendicular to the longitudinal axis of the wind turbine tower.

Thus, the legs reach from the longitudinal axis of the wind turbine tower out towards the wall of the wind turbine tower and end outside of the wall of the wind turbine tower.

The strakes are connected to the outer end of the legs. The three legs can be rotated around an axis that is mainly identical with the longitudinal axis of the tower. Thus, the strake that is connected to the outer end of the leg is wrapped around the outer side of the wind turbine tower.

The legs are supported by a mounting bracket and the mounting bracket is attached to the tower. To rotate the legs in respect to the tower and the mounting bracket, the arrangement comprises means to rotate the legs.

The means to rotate the legs of the arrangement are located within the premises of the tower. Thus, the strake can easily be wrapped around the tower, whereby the arrangement is operated from inside the tower. Thus, the safety risk for personnel is reduced.

The mounting bracket is prepared and arranged in a way to be mounted to a flange of the wind turbine tower.

The arrangement is attached to the upper end of the wind turbine tower. The upper end of the wind turbine tower comprises a flange. The flange at the upper end of the wind turbine tower, is later used to mount the nacelle of the wind turbine to the tower.

The flange and the upper end of the wind turbine tower comprises holes and bolts that can be used to connect the arrangement to the upper end of the wind turbine tower. Thus, no additional holes or means are needed to attach the arrangement to the tower.

The means is a lever for manual operation.

The arrangement to wrap the strake around the wind turbine tower comprises means to operate the arrangement. The means is a lever and the lever can be operated manually.

Thus, installation personnel can operate the arrangement and can wrap the strake around the wind turbine tower manually.

Thus, no additional machine or power is needed to perform the installation of the strake at the wind turbine tower. In addition, a hollow strake, filled with air, is lightweight enough to be installed manually.

BRIEF DESCRIPTION

Figure 1:
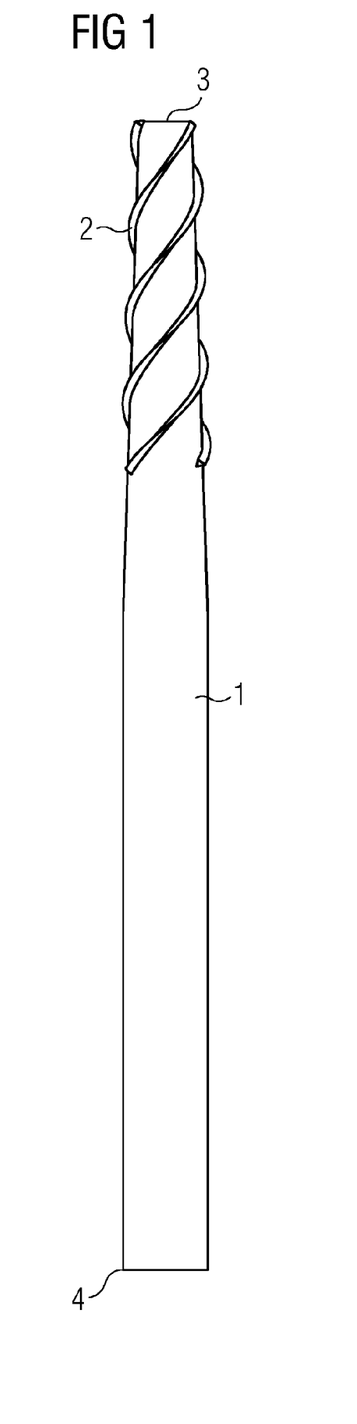
FIG. 1 shows a wind turbine tower with strakes.

Some of the embodiments will be described in detail, with reference to the following figures, wherein like designations denote like members, wherein:

FIG. 1 shows a wind turbine tower 1 with strakes 2.

DETAILED DESCRIPTION

Strakes are used to reduce vortex induced vibrations (VIV) during the installation and transportation of the wind turbine tower.

The wind turbine tower 1 comprises a top end 3 and a bottom end 4. The strakes 2 are attached to the tower 1 from the top of the tower 3 towards the bottom of the tower 4 for at least a part of the length of the tower 1.

FIG. 1 shows the wind turbine tower 1 in an upright position. A wind turbine tower 1 that is used for an offshore wind turbine is transported from the harbor towards the installation site of the wind turbine by ship. On the ship the wind turbine tower 1 is transported in an upright position.

Due to the wind interacting with the wind turbine tower 1, the wind turbine tower 1 starts to vibrate. The wind flows along the sides of the wind turbine tower 1 in a non-laminate structure. Thus, vortexes are generated in the wind shadow of the wind turbine tower 1.

This vortex wind structures lead to vortex induced vibrations in the tower. The vortex induced vibrations can be reduced by using strakes 2 at the tower.

The strakes 2 at the tower 1 are only needed during transportation and installation of the wind turbine tower. The strakes 2 are disassembled from the tower 1 before the operation of a wind turbine.

Figure 2:
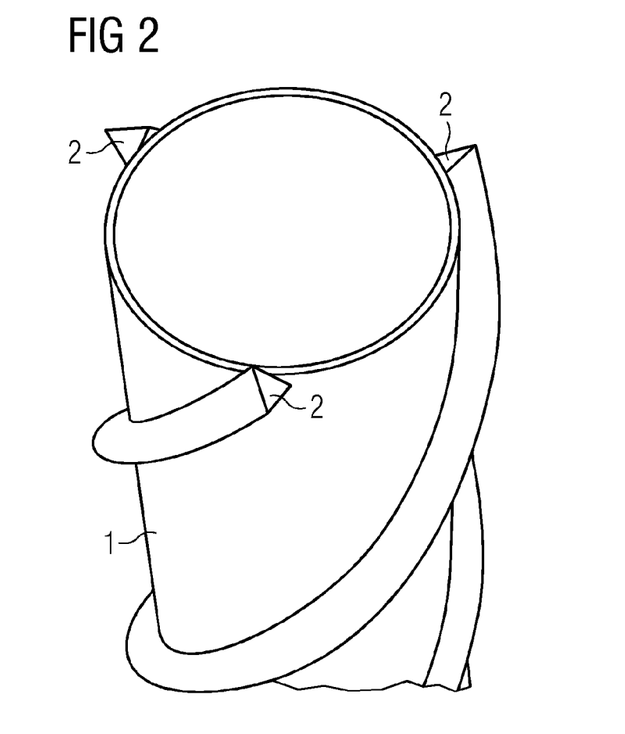
FIG. 2 shows a detail of the strakes.

FIG. 2 shows a detail of the strakes.

FIG. 2 shows a detail of the strakes 2 that are attached to a wind turbine tower 1. The strakes 2 are wrapped around the wind turbine tower 1, whereby the angle of inclination of the strakes in respect to the longitudinal axis of the wind turbine tower is between 10° and 80°.

The strakes 2 show a triangular shape in a crosscut perpendicular to the longitudinal axis of the strake. The strakes 2 are non-permanently attached to the tower 1.

Figure 3:
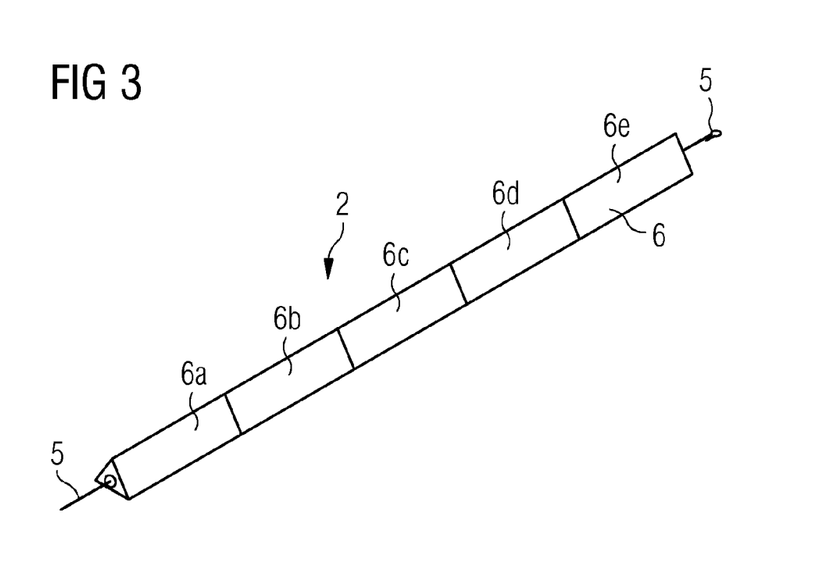
FIG. 3 shows a detail of a strake.

FIG. 3 shows a detail of a strake.

FIG. 3 shows a detail of a strake 2. The strake 2 comprises a rope 5 that leads through the strake in a longitudinal direction.

The segments 6a, 6b, 6c, 6d and 6e cover most part of the rope 5. The segments 6a, 6b, 6c, 6d and 6e of the strake 2 show a triangular shape in a crosscut perpendicular to the longitudinal axis of the strake 2.

When the strake 2 is attached to the tower, the rope 5 is wrapped around the tower and the segments 6A to 6E abut on the outer wall of the tower. The surface of the segments 6 of the strake 2 interacts with the wind and deflects the wind in a way that the generation of vortex on the leeward side of the tower is reduced.

Figure 4:
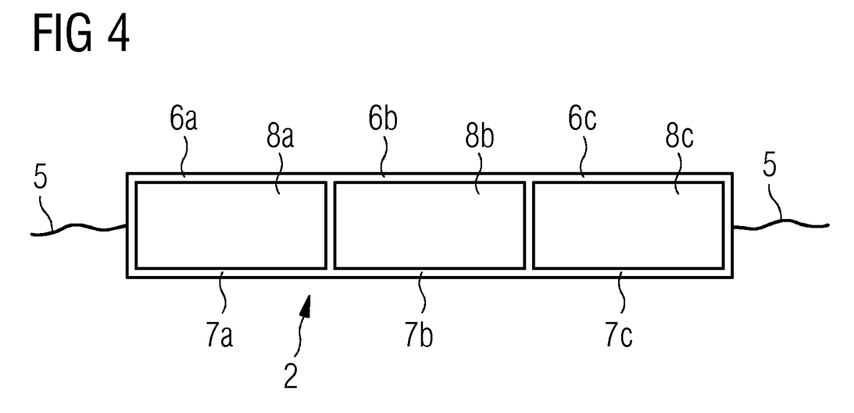
FIG. 4 shows another detail of a strake.

FIG. 4 shows another detail of a strake.

FIG. 4 shows a second detail of a strake 2. The strake 2 comprises a rope 5 that leads through the strake 2 in a longitudinal direction.

The segment 6a, 6b and 6c cover most of the length of the rope 5. The segments 6a, 6b and 6c comprise an outer structure 7a, 7b and 7c. Inside of the outer structure 7a, 7b and 7c the segments 6a, 6b and 6c comprise a cavity 8a, 8b and 8c.

The cavity is one continuous cavity per segment that fills most of the part of the segment. The cavity is filled with the fluid, preferably with air. Thus, the outer structure 7a, 7b and 7c of the segments surrounds an hollow space filled with air.

The strake 2 is attached to a wind turbine tower before transportation and installation of the wind turbine tower.

The strake 2 is detached from the wind turbine tower before the nacelle is added to the top of the wind turbine tower. Thus, the strake needs to be handled and stored on board of a ship used for the offshore installation.

The strake 2 is handled by personal and under windy conditions. The strake comprises segments with an outer structure filled with air. Thus, the segments of the strake, and thus the strake itself is more lightweight and easy to handle.

Figure 5:
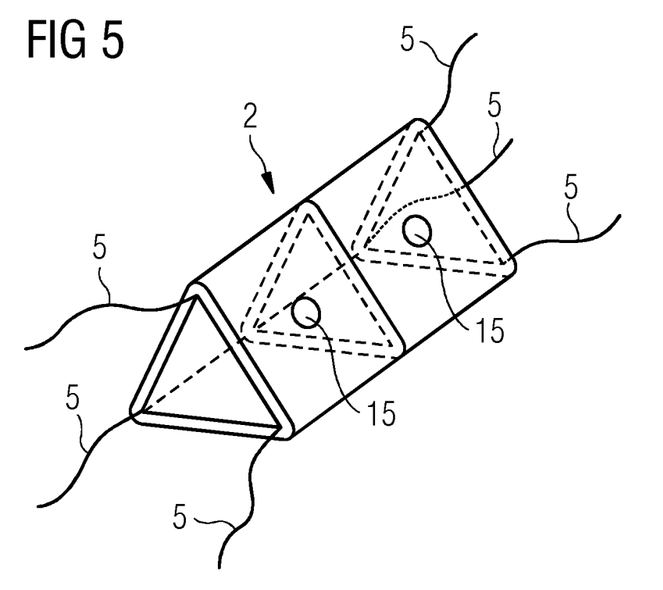
FIG. 5 shows another embodiment of the strake.

FIG. 5 shows another embodiment of the strake.

FIG. 5 shows another embodiment of the strake 2. The strake 2 comprises an outer structure that is elastically flexible.

The outer structure of the strake 2 comprises a sealable opening, for example a valve 15 to inflate and deflate the segments of the strake 2. Thus, the strake can be inflated before it is attached to the tower of the wind turbine and can be deflated after it is detached from the wind turbine and before it is stored.

Thus, the volume of the strake can be reduced for storage and transportation of the strake.

In addition, this embodiment in FIG. 5 shows that a strake can also comprise three ropes 5 whereby the segments of the strake cover at least a part of the length of the ropes 5. In this embodiment, the ropes 5 are arranged in the outer angles of the triangular-shaped form of the strake.

Figure 6:
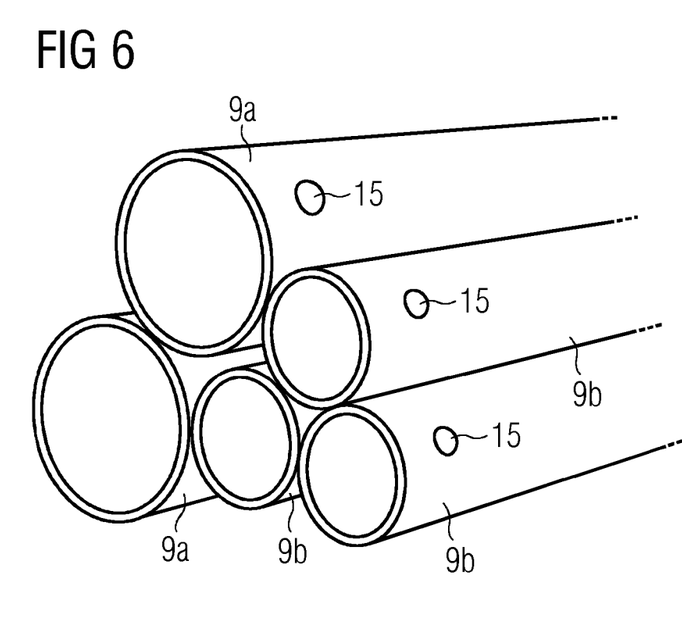
FIG. 6 shows a third embodiment of the strake.

FIG. 6 shows a third embodiment of the strake.

FIG. 6 shows a third embodiment of the strake whereby the triangular shape of the strake is achieved by combining elements 9a and 9b, whereby the elements 9 are arranged in parallel to each other.

The elements 9a show a larger diameter than the elements 9b, whereby the elements 9b lead to a higher structural stability in the corner where the elements 9b are arranged.

In the combination of the elements 9a and 9b, a triangular shape in a crosscut perpendicular to the longitudinal axis of the strake is achieved.

The elements 9a and 9b of the strake comprise a sealable opening, for example a valve 15, to inflate and deflate the elements 9 with air.

Figure 7:
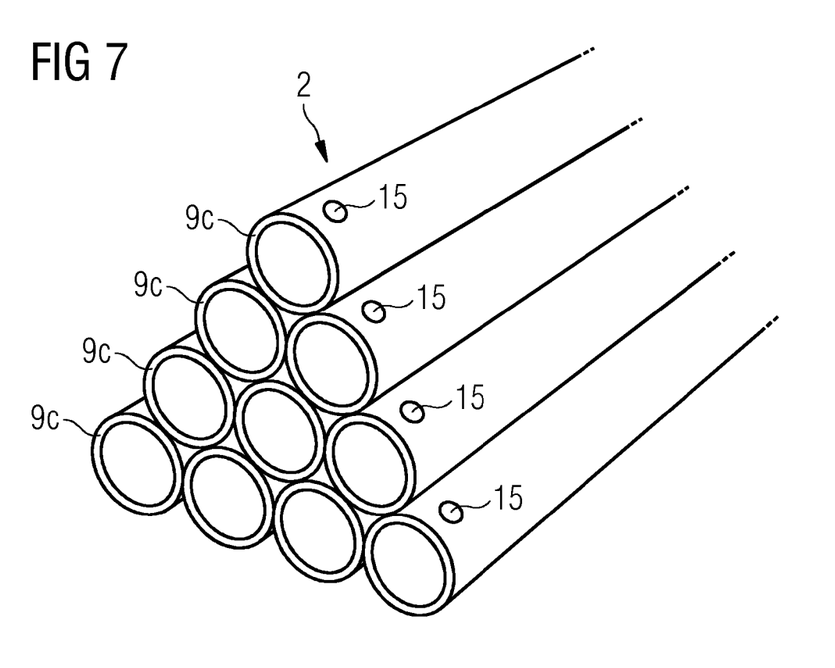
FIG. 7 shows a fourth embodiment of the strake.

FIG. 7 shows a fourth embodiment of the strake.

FIG. 7 shows a fourth embodiment of the strake 2. The strake 2 comprises a triangular shape in a crosscut perpendicular to the longitudinal axis of the strake 2.

The triangular shape of the strake 2 is achieved by combining cylindrical elements 9c, whereby the elements 9c all comprise the same diameter. To achieve a triangular shape, three, six or ten elements 9c can be combined.

The elements 9c are arranged in parallel to each other.

Each of the elements 9c comprises a sealable opening or a valve to inflate or to deflate the strake element. Thus, the strake 2 comprises a triangular shape.

When the elements 9c are inflated with a fluid, the strake 2 can be deflated by opening the valve 15 to reduce the overall volume of the strake and to facilitate the storage of the strakes 2.

The elements 9c can be tubes of a plastic of rubber material, for example. Thus, the elements 9c of the strake 2 are elastically flexible and can be rolled up on a wheel, when the elements 9c are deflated.

Figure 8:
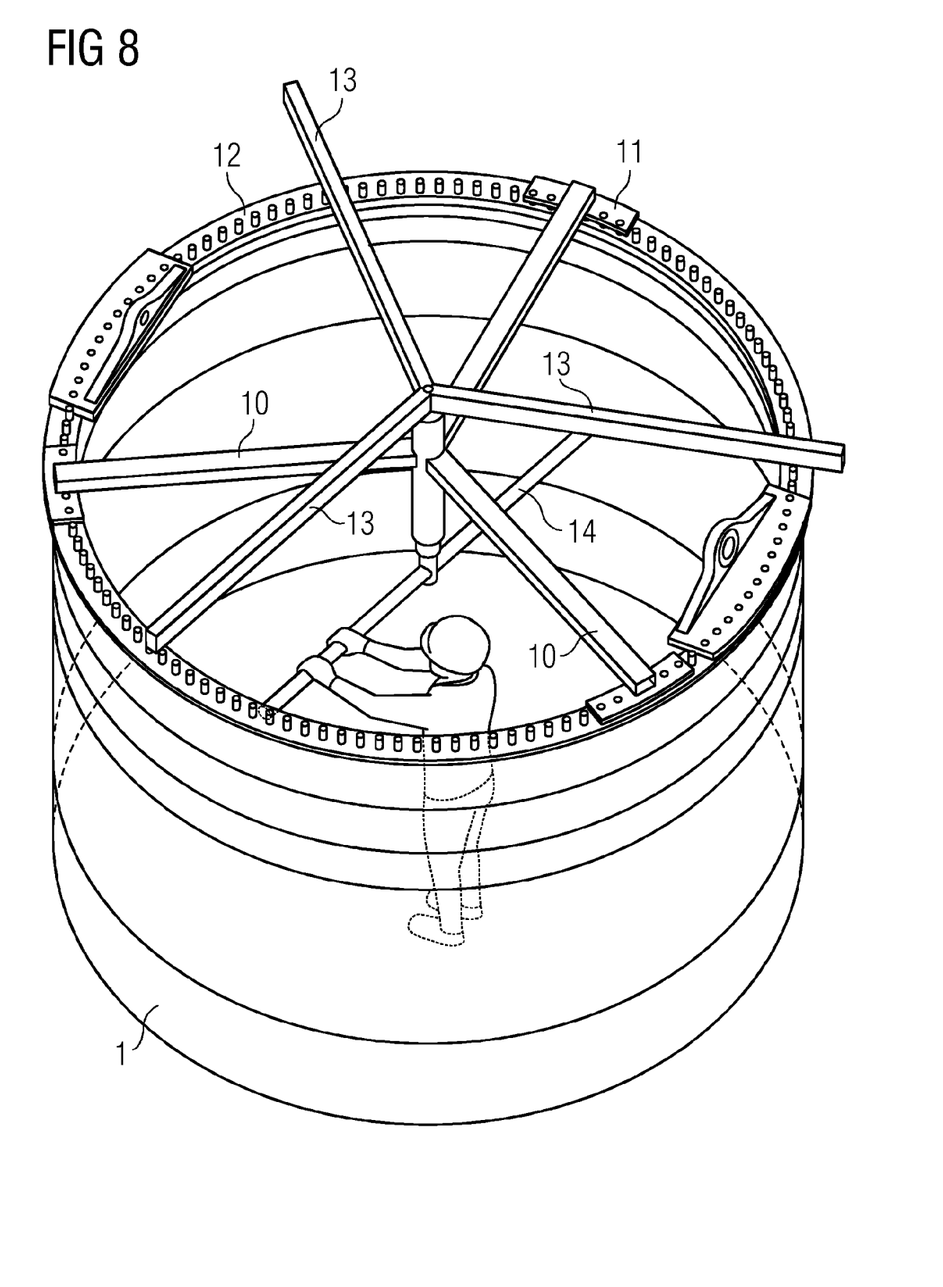
FIG. 8 shows an arrangement to install the strakes on the outer wall of a wind turbine tower.

FIG. 8 shows an arrangement to install the strakes on the outer wall of a wind turbine tower.

The arrangement comprises a mounting bracket 10 to mount the arrangement to the upper end of a wind turbine tower. The upper end of the wind turbine tower in FIG. 8 comprises a flange and the mounting bracket 10 is screwed to the holes in the flange of the wind turbine tower.

To screw the mounting bracket to the flange, a mounting plate 11 is attached to the mounting bracket. The arrangement comprises three legs 13, whereby the three legs 13 are connected in a star-shaped manner.

The legs 13 are rotatable in respect to the mounting brackets of the arrangement. The legs 13 are rotatable around an axis that is arranged in parallel to the longitudinal axis of the wind turbine tower 1.

In this embodiment, the arrangement is operated manually by means 14, in this case a lever, where a worker can rotate the legs 13 in respect to the mounting brackets 10.

The rope 5 of a strake 2 is attached to the end of a leg 13. Thus, three strakes 2 can be attached to the wind turbine tower 1 with the arrangement as shown.

A first end of the rope 5 is attached to the leg 13. A second end of the rope 5 is attached to the tower of the wind turbine.

The star-shaped element with the legs 13 is then rotated in respect to the tower 1. Thus, the strake 2 with the rope 5 is wrapped around the outer side of the wall of the tower 1.

The mounting arrangement, as shown in FIG. 8, and the strakes 2 are attached to the tower, before the tower is transported to the installation site of the wind turbine and installed.

The arrangement and the strakes are detached from the tower before the installation of the nacelle on top of the tower.

The illustration in the drawings is in schematic form. It is noted that in different figures, similar or identical elements are provided with the same reference signs.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A strake for a wind turbine tower,
   wherein the strake is a strake to be mounted to a wind turbine tower to reduce vortex induced vibrations,
   wherein the strake comprises an outer structure and the outer structure defines three sides that are interconnected by three angles, so that the strake comprises a mainly triangular shape in its cross-cut perpendicular to its longitudinal direction,
   wherein
   the strake comprises at least one detachable, inflatable and deflatable element that includes a contiguous cavity that is filled with a fluid, and
   wherein the detachable, inflatable and deflatable element is elastically flexible such that it may be rolled or folded for transportation or storage.

2. The strake according to claim 1, wherein the cavity comprises at least 80% of the volume of the element, when the cavity is filled with fluid.

3. The strake according to claim 1, wherein the fluid is air.

4. The strake according to claim 1, wherein the outer structure comprises a resealable opening that connects the cavity) to the space around the strake, to allow the fluid to enter or leave the cavity in the element.

5. The strake according to claim 1, wherein the strake comprises a plurality of elements, and that the elements comprise an elongated shape and are mounted in parallel to form the strake.

6. The strake according to claim 5, wherein a strake comprises at least three elements.

7. The strake according to claim 1, wherein the strake comprises a protective cover to enwrap at least one element.

8. An arrangement to mount a strake according to claim 1,
   wherein the arrangement comprises a mounting bracket that is detachably attached to the wind turbine tower,
   wherein the arrangement comprises at least one leg,
   wherein the strake comprises an end, and the end is attached to the leg,
   wherein the arrangement includes a device to operate the arrangement, that is connected to the leg,
   wherein the device to operate the arrangement and the leg are rotatable in respect to the mounting bracket, so that the detachable strake, that is connected to the leg, is wrapped around the tower, when the leg is rotated in respect to the mounting bracket.

9. The arrangement according to claim 8, wherein the mounting bracket is prepared and arranged in a way to be mountable to a flange of the wind turbine tower.

10. The arrangement according to claim 8, wherein the device to operate is a lever for manual operation.

* * * * *

UNITED STATES PATENT AND TRADEMARK OFFICE
CERTIFICATE OF CORRECTION

PATENT NO. : 9,567,745 B2
APPLICATION NO. : 14/865033
DATED : February 14, 2017
INVENTOR(S) : Jesper Moeller et al.

Page 1 of 1

It is certified that error appears in the above-identified patent and that said Letters Patent is hereby corrected as shown below:

In the Claims

Column 8, Line 44, please delete ")" after cavity

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*